(12) United States Patent
Ichimura

(10) Patent No.: US 6,324,133 B1
(45) Date of Patent: Nov. 27, 2001

(54) OPTICAL RECORDING AND REPRODUCING APPARATUS AND OPTICAL RECORDING AND REPRODUCING METHOD

(75) Inventor: Isao Ichimura, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/350,293

(22) Filed: Jul. 9, 1999

(30) Foreign Application Priority Data

Jul. 17, 1998 (JP) .................................................. 10-203983

(51) Int. Cl.[7] ...................................................... G11B 7/09
(52) U.S. Cl. ...................... 369/44.27; 369/44.29; 369/112.24
(58) Field of Search ............................. 369/44.23, 44.29, 369/44.35, 112.24, 44.27, 13, 112.25, 112.26, 44.13

(56) References Cited

U.S. PATENT DOCUMENTS 5,712,842 * 1/1998 Yamamoto et al. ............... 369/44.23
6,005,834 * 12/1999 Maeda et al. ..................... 369/112.24
6,097,688 * 8/2000 Ichimura et al. .................. 369/44.23
6,104,691 * 8/2000 Yamato et al. ................... 369/112.24
6,115,347 * 9/2000 Ichimura et al. ................. 369/112.24

* cited by examiner

Primary Examiner—Thang V. Tran
(74) Attorney, Agent, or Firm—Sonnenschein, Nath & Rosenthal

(57) ABSTRACT

In order to carry out optimization adjustment of a distance between a first lens and a second lens and optimization adjustment of focus offset of two group object lenses in a short period of time, after focusing is operated, while the distance between the first lens and the second lens of the two group object lenses is being adjusted by a first electromagnetic actuator, the two group object lenses are integrally moved by a second electromagnetic actuator, an amplitude variation caused by spherical aberration and an amplitude variation caused by focus servo error which are produced in an RF signal S2 are separated by an envelope detection unit A33 and an envelope detection unit B34 and the two adjustments are carried out simultaneously.

16 Claims, 6 Drawing Sheets

FIG. 3
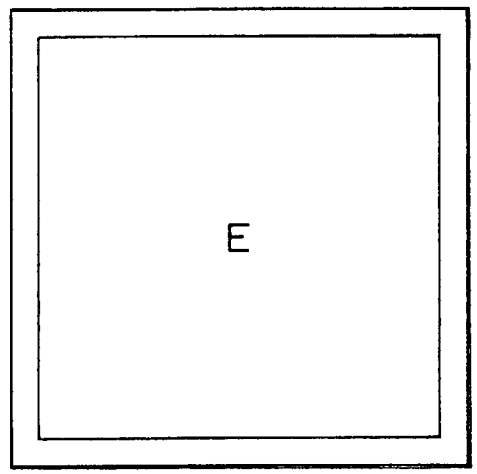
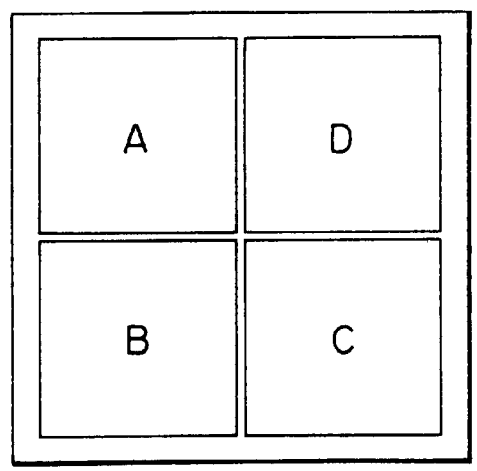
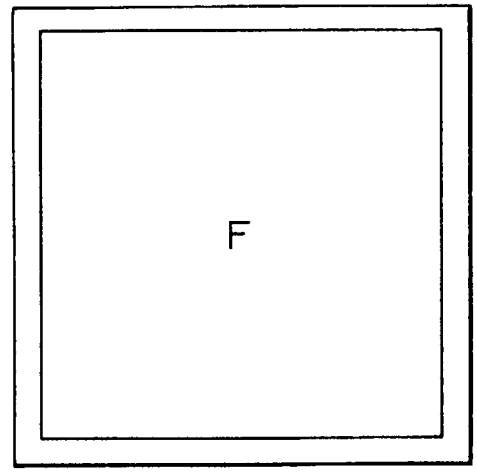

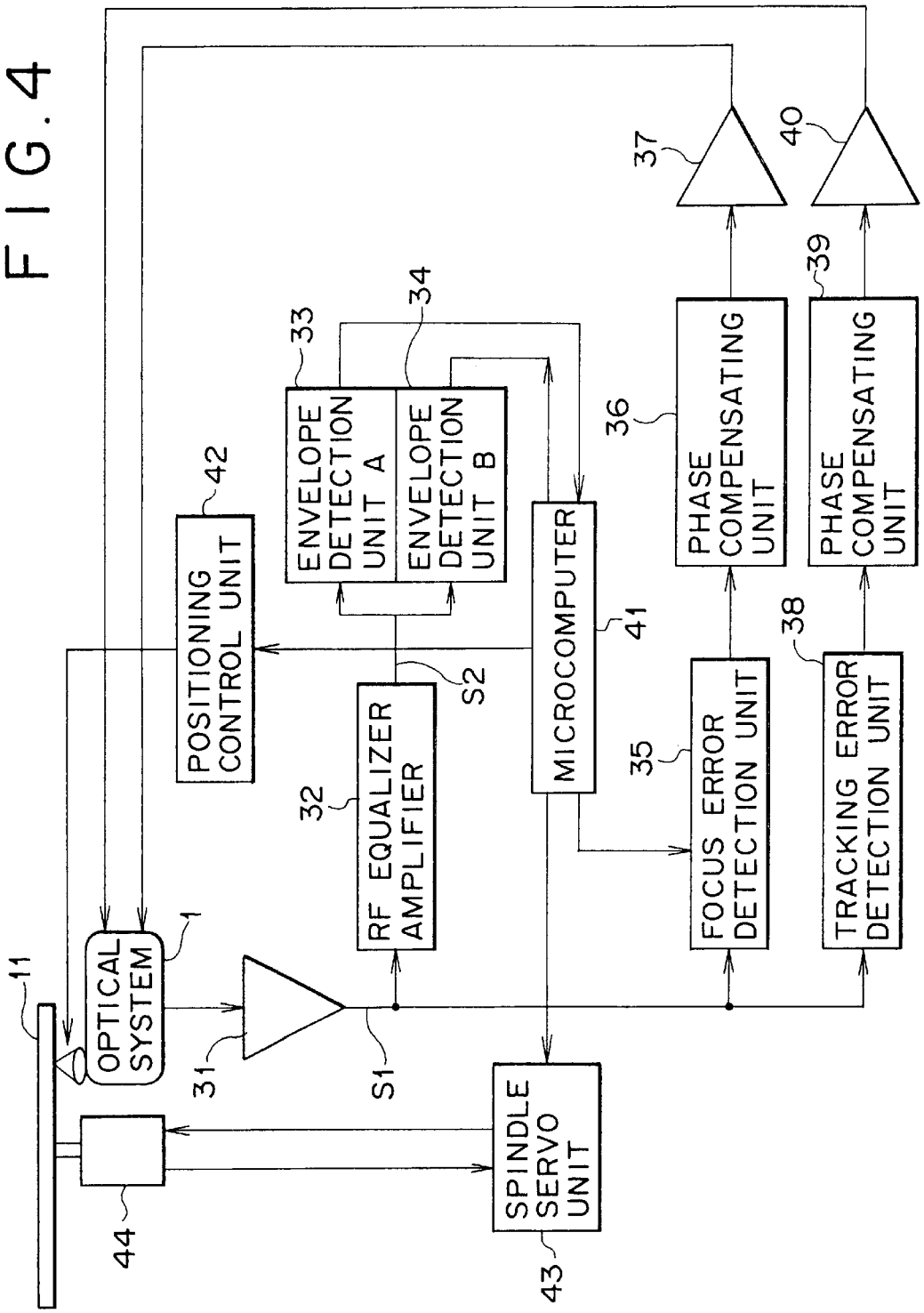

OPTICAL RECORDING AND REPRODUCING APPARATUS AND OPTICAL RECORDING AND REPRODUCING METHOD

RELATED APPLICATION DATA

The present application claims priority to Japanese Application No. P10 203983 filed Jul. 17, 1998, which application is incorporated herein by reference to the extent permitted by law.

BACKGROUND OF THE INVENTION

1. Field of the Invention

The present invention relates to an optical recording and reproducing apparatus and an optical recording and reproducing method, particularly to an optical recording and reproducing apparatus and an optical recording and reproducing method for recording and reproducing information by using two group object lenses.

2. Description of the Related Art

In a recording and reproducing apparatus of an optical record medium, a spot size d on the record medium is represented by the following equation (1) when a wavelength of a light source is designated by notation $\lambda$ and an aperture number of an object lens is designated by NA (Numerical Aperture).

$$d = \lambda/NA \quad (1)$$

As is known from Equation (1), the shorter the wavelength $\lambda$ of a light source and the larger the numerical aperture NA of the object lens, the smaller the spot size d and high density recording is made feasible.

In such a relationship, as a method of increasing the numeral aperture of an object lens, it is known to be effective to use aspherical two group object lenses. JP-A-9-251645 discloses a record medium recording and reproducing apparatus and a record medium recording and reproducing method by an applicant the same as the applicant of this application in which spherical aberration is restrained from occurring by using two group object lenses. When such two group object lenses are used, it becomes necessary to achieve optimization of a distance between the two group object lenses and minimize wave front aberration in order to make best a reproducing signal from a record medium.

In the meantime, a focal depth fd of an object lens specified by mean square error ($\lambda/14$) of wave front aberration, is calculated by the following equation (2).

$$fd = \lambda/NA^2 \quad (2)$$

As is known from Equation (2), when an object lens having a high numerical aperture is used, the focal depth fd becomes extremely small. For example, when a numerical value of two group object lenses is set to 0.85, the focal depth fd is reduced to about a half of that in the case of DVD-RAM (object lens numeral aperture NA=0.6). Here, DVD indicates a digital video disk and DVD-RAM indicates a rewritable digital video disk.

Therefore, when an object lens having a high numerical aperture is used, further accurate focusing control is requested and the lens need to follow precisely a change in environmental temperature and an aging change.

As a method of achieving optimization of a distance between two group object lenses and minimizing wave front aberration, Japanese Patent Application No. 8-340903 discloses an optical disk recording and reproducing apparatus and its method by an applicant the same as the applicant of the application in which after integrating two group lenses and carrying out focusing operation of focus servo, a front lens is independently moved in an optical axis direction by which wave front aberration is adjusted to minimize.

Further, as accurate focusing control, Japanese Patent Application No. 9-84090 discloses a focusing control apparatus and its method and an optical disk apparatus by an applicant the same as the applicant of this application in which in focus servo in an optical disk apparatus using an optical head constituted by two group object lenses having a high numerical aperture, by optimizing focus offset, a disk reproducing signal is adjusted to be best.

However, the above-described respective optimization of the distance between lenses of the two group object lenses and optimization of focus offset are carried out based on the same reproducing signal from a record medium and both are separately adjusted. Therefore, a long period of time is required in the adjustment in comparison with a case of an object lens constituted by a single piece of a lens.

SUMMARY OF THE INVENTION

The present invention has been carried out in consideration of the above-described points and it is an object of the present invention to provide an optical recording and reproducing apparatus and an optical recording and reproducing method capable of simultaneously carrying out optimization adjustment of a distance between lenses of two group object lenses and optimization adjustment of focus offset in a short period of time.

In order to resolve the above-described object, according to a first aspect of the present invention, there is provided an optical recording and reproducing apparatus for carrying out either of recording and reproducing of information by irradiating a beam to an optical record medium via two group lenses constituted by a first lens and a second lens, the optical recording and reproducing apparatus comprising first driving means for moving the first lens in an optical axis direction relative to the second lens and second driving means for moving the two group lenses in the optical axis direction, wherein first adjustment for optimizing a distance between the first lens and the second lens by using the first driving means and second adjustment for optimizing a focus offset by using the second driving means are simultaneously carried out by simultaneously driving the first driving means and the second driving means when focus servo is being operated.

According to a second aspect of the present invention, there is provided the optical recording and reproducing apparatus wherein simultaneously with periodically moving the first lens in the optical axis direction relative to the second lens by the first driving means, the two group lenses constituted by the first lens and the second lens are periodically moved in the optical axis direction by the second driving means to thereby carry out the first and the second adjustments.

According to a third aspect of the present invention, there is provided the optical recording and reproducing apparatus wherein a movement period of periodically moving the first lens relative to the second lens is longer than a movement period of periodically moving the two group lenses comprising the first lens and the second lens.

According to a fourth aspect of the present invention, there is provided the optical recording and reproducing apparatus wherein the periodic movements are of sine waveforms.

Such resolving means is applicable similarly to an optical recording and reproducing apparatus for recording or reproducing information by irradiating a beam to an optical record medium via an optical system having a constitution including an object lens comprising one or more of lenses and a relay lens group comprising one or more of lenses in accordance with a fifth through an eighth aspect of the present invention. That is, only the relationship between the first lens and the second lens is replaced by a relationship between the relay lens group and the object lens.

Further, according to a ninth aspect of the present invention, there is provided an optical recording and reproducing method of carrying out either of recording and reproducing of information by irradiating a beam to an optical record medium via two group lenses comprising a first lens and a second lens wherein after focus servo has been operated, first adjustment for optimizing a distance between the first lens and the second lens by moving the first lens in an optical axis direction relative to the second lens and second adjustment for optimizing a focus offset by moving the two group lenses in the optical axis direction are carried out simultaneously.

In this case, that the movements are made periodic as in a tenth aspect of the present invention, that a movement period of the first lens relative to the second lens is made longer than a movement period of the two group lenses according to an eleventh aspect of the present invention and that the periodic movements are of sine waveforms according to a twelfth aspect of the present invention, are similar to those in the above-described optical recording and reproducing apparatus.

Further, the present invention is applicable similarly to an optical recording and reproducing method for recording or reproducing information by irradiating a beam to an optical record medium via an optical system having a constitution including an object lens comprising one or more of lenses and a relay lens group comprising one or more of lenses according to a thirteenth aspect of the present invention. That is, the relationship between the first lens and the second lens is only replaced by the relationship between the relay lens group and the object lens.

In this case, that the movements are made periodic according to a fourteenth aspect of the present invention, that a movement period of moving the relay lens group relative to the object lens is made longer than a movement period for moving the object lens according to a fifteenth aspect of the present invention and the periodic movements are of sine waveforms according to a sixteenth aspect of the present invention are similar to those of the above-described optical recording and reproducing apparatus.

Next, an explanation will be given of the operation.

Since the first driving means and the second driving means are provided, the two group lenses can integrally be moved simultaneously with moving the first lens relative to the second lens. Therefore, when the focus servo is being operated, optimization adjustment of the focus offset which is carried out while integrally moving the two group lenses and optimization adjustment of the distance between the two group lenses which is carried out by moving the first lens relative to the second lens can be carried out simultaneously.

In this case, a variation in an amplitude caused by spherical aberration and a variation in the amplitude caused by a focus servo error can be separated in frequency bands by periodically and respectively carrying out movement of a total of the two group lenses and movement for changing a distance between the two group lenses and differentiating periods thereof.

Further, the variation in the amplitude caused by the spherical aberration can accurately be detected by making the movement period for changing the distance between the two group lenses longer than the movement period of the total of the two group lenses.

Further, by making the movement of the total of the two group lenses and the movement for changing the distance between the two group lenses sine waveforms, components of variations necessary for the respective adjustments can accurately be separated by filters.

Further, the above-described operation is similarly operated in cases of the adjustment of the distance between the object lens and the relay lens group and the adjustment of the focus offset in an optical system having a constitution including an object lens comprising one or more of lenses and a relay lens group comprising one or more of lenses.

BRIEF DESCRIPTION OF THE DRAWINGS

FIG. 3 is a view showing arrangement of light receiving elements divided in six;

FIG. 4 is a circuit block diagram showing a constitution of an optical disk recording and reproducing apparatus according to the embodiment of the present invention;

FIGS. 5A and 5B are diagrams showing an envelope of an RF signal according to the embodiment of the present invention in which FIG. 5A is a diagram showing a variation in focus offset and FIG. 5B is a diagram showing a change in the envelope of the PF signal in correspondence with the variation in the focus offset;

DETAILED DESCRIPTION OF THE PREFERRED EMBODIMENTS

An explanation will be given of an optical disk recording and reproducing apparatus using aspherical two group object lenses having a high numerical aperture as an example of embodiments of the present invention.

First, an explanation will be given of aspherical two group object lenses for an optical pickup according to the embodiment of the present invention.

Figure 1:
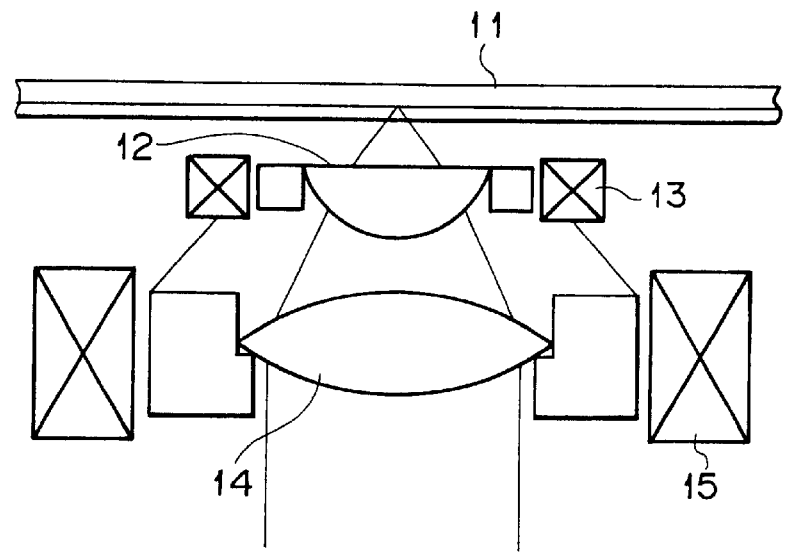
FIG. 1 is a view showing a constitution of an aspherical two group object lenses for an optical pickup according to an embodiment of the present invention.

In FIG. 1, two group object lenses are formed by a first lens 12 and a second lens 14, the second lens 14 is mounted on a second electromagnetic actuator 15 and a numerical aperture NA thereof is about 0.5. Further, the first lens 12 is mounted on a first electromagnetic actuator 13 installed separately to dispose on an optical axis the same as that of the second lens 14 and is constituted to be able to control to dispose at an arbitrary position in the optical axis direction. Further, notation 11 designates an optical disk.

The first electromagnetic actuator 13 is constituted to move the first lens 12 in the optical axis direction relative to the second lens 14 and an interval between the first lens 12 and the second lens 14 can be adjusted by voltage applied on the first electromagnetic actuator 13.

The second electromagnetic actuator 15 is a two-axes actuator and is constituted to move the first lens 12 and the second lens 14 in the optical axis direction (focus direction) and move these in a direction orthogonal to tracks of the optical disk 11 (tracking direction) By applying a focusing error signal and a tracking error signal to the second electromagnetic actuator 15, distances from the optical disk 11 to the first lens 12 and the second lens 14 can be adjusted and the first lens 12 and the second lens 14 can be moved in the direction orthogonal to tracks of the optical disk 11.

Further, the first and the second electromagnetic actuators 13 and 15 may be of other driving means such as a linear motor or the like.

Optical beam from a semiconductor laser, not illustrated, converges on the optical disk 11 by passing through two of the first lens 12 and the second lens 14 and in that occasion, an effective numerical aperture NA of object lens in the two group object lenses becomes about 0.85. Further, by realizing the high numerical aperture, compared with a conventional optical pickup, a working distance of a object lens is reduced and according to the embodiment, the value is about 100 μm.

When the numerical number is increased, a skew tolerance value which is a value tolerating skew in an optical disk recording and reproducing apparatus is generally reduced. When wave front aberration by disk skew (X-direction) is represented by Seidal's polynomial, the following equation (3) is established.

$$W(x,y)=W_{22}x^2+W_{31}(X^2+Y^2)+W_{51}(X^2+Y^2) \quad (3)$$

In the above equation, notation $W_{22}$ designates astigmatism, notation $W_{31}$, designates coma aberration of the third order and $W_{51}$ designates coma aberration of the fifth order. Among them, the coma aberration $W_{31}$ of the third order which is a dominant factor is given by Equation (4) and when a skew angle θ is as small as 1 degree or smaller, the coma aberration $W_{31}$ is substantially proportional to cube of the numeral aperture NA and a disk substrate thickness t.

$$W_{31}=(n^2-1)n^2 \cdot \sin\theta \cdot \cos\theta/2(n^2-\sin^2\theta)^{2/5} \cdot t \cdot NA^3/\lambda \quad (4)$$

Accordingly, in the optical disk recording and reproducing apparatus in which the value of the numerical aperture NA is increased to 0.85 by using the aspherical two group object lenses, in order to ensure skew tolerance comparable to that of DVD, the disk substrate thickness t needs to thin to about 0.1 mm.

Figure 2:
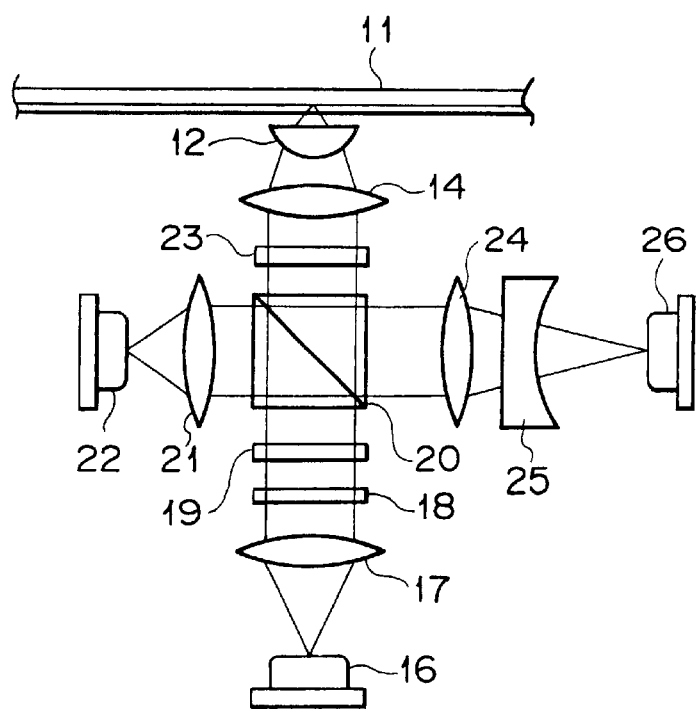
FIG. 2 is a view showing a constitution of an optical pickup for optical disk recording and reproducing according to the embodiment of the present invention.

FIG. 2 is a view showing a constitution of an optical pickup for optical disk recording and reproducing according to the embodiment.

In FIG. 2, emitted beam from a semiconductor laser 16 is changed into parallel ray by a collimator lens 17, passes through a diffraction grating 18 for forming a side spot, thereafter passes through respectively a ½ wave plate 19, a beam splitter 20 and a ¼ wave plate 23 and is converged on the optical disk 11 by the second lens 14 and the first lens 12 of the two group object lenses. A portion of the emitted beam is reflected by the beam splitter 20, converged by a lens 21, guided to a light receiving element 22 for detecting emitted beam power and is used for the purpose of controlling laser disk face output on the optical disk 11. Further, an incident beam amount of the light receiving element 22 for detecting emitted beam power is adjusted by rotating the ½ wave plate 19.

In the meantime, reflected beam from the optical disk 11 is reflected by the above-described beam splitter 20 and thereafter guided to a detection path. According to the embodiment, there are used an astigmatism method for a focusing error signal and a 3 spots method for a tracking error signal. In order to form the focusing error signal based on the astigmatism method, the reflected beam is converged by a convex lens 24 and a multiple lens 25, made incident on a light receiving element 26 for detecting a servo error signal and photoelectrically converted.

FIG. 3 is a view showing arrangement of optical detection elements divided in six used in the light receiving element 26 for detecting a servo error signal and an RF signal. In FIG. 3, A, B, C, D, E and F of six light receiving elements are arranged such that A, B, C and D of the light receiving elements divided in four are disposed at the center and E and F thereof are respectively disposed in a track crossing direction, symmetrically in respect of a direction of a tangential line of a track. A focusing error signal FE is provided by a calculation by Equation (5) based on outputs of the respective A, B, C and D light receiving elements shown by FIG. 3.

$$FE=(A+C)-(B+D) \quad (5)$$

Further, a tracking error signal TE is calculated by a calculation by Equation (6) based on outputs of the respective E and F light receiving elements.

$$TE=E-F \quad (6)$$

Further, an RF signal is calculated by a sum of outputs of the respective A, B, C and D light receiving elements as shown by Equation (7).

$$RF=A+B+C+D \quad (7)$$

Next, an explanation will be given of a constitution of an optical disk recording and reproducing apparatus according to the embodiment in reference to a block diagram shown by FIG. 4.

In FIG. 4, a signal received by an optical system 1 in an optical pickup is supplied to a head amplifier 31 and is amplified to a necessary predetermined level. An amplified signal S1 is equalized to a calculation based on Equation (7) and a predetermined characteristic by an RF equalizer amplifier 32. An output signal from the RF equalizer amplifier 32 is supplied as an RF signal S2 to a signal processing system, not illustrated, and supplied to an envelope detection unit A33 and an envelope detection unit B34 as signals for carrying out optimizing adjustment of a distance between lenses of the two group object lenses and optimizing adjustment of focus offset.

A microcomputer 41 is a control unit for controlling operation of a total of the optical disk recording and reproducing apparatus. The microcomputer 41 is provided with a function for carrying out control in respect of a spindle servo unit 43 of a spindle motor 44 and adjusting object focus offset and the distance between lenses of the two group object lenses. Outputs from the envelope detection unit A33 and the envelope detection unit B34 are supplied to the microcomputer 41, thereafter processed based on an adjusting method, mentioned later, outputted to a focus error detection unit 35 as a control signal for adjusting focus offset and outputted to a positioning control unit 42 as an instruction signal for the distance between the two group object lenses.

The output signal S1 from the head amplifier 31 is also supplied to the focus error detection unit 35 and a tracking error detection unit 38. The focus error detection unit 35 carries out calculation based on the Equation (5) in respect of the signal S1 and adds a control signal for adjusting focus offset from the microcomputer 41. The tracking error detection unit 38 carries out a calculation based on Equation (6) in respect of the signal S1. Outputs from the focus error detection unit 35 and the tracking error detection unit 38 are subjected to phase compensation by phase compensating units 36 and 39, thereafter amplified to necessary signal amplitudes by amplifiers 37 and 40 and fed back to the optical system 1.

Further, the distance between lenses of the two group object lenses is controlled by the positioning control unit 42.

An explanation will be given as follows of a method of adjusting the distance between lenses of the two group object lenses and a method of adjusting the focus offset under the above-described hardware constitution.

First, by carrying out focusing operation, there is brought about a state in which focus servo is being operated. Next, in order to promote accuracy of adjustment, by carrying out tracking operation, there is brought about a state in which tracking servo is operated.

Figure 5A:
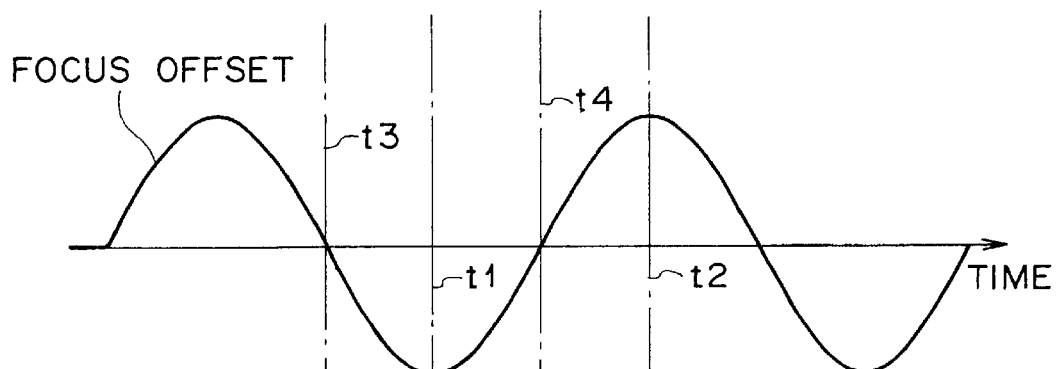
Figure 5B:
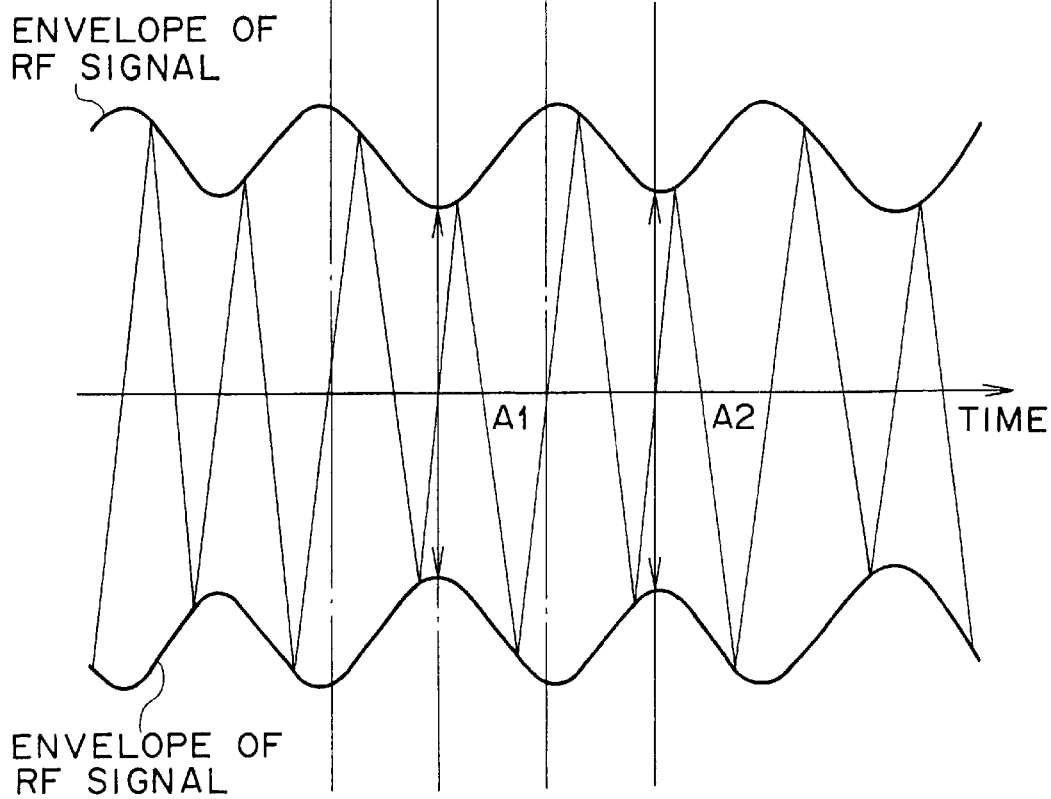

FIGS. 5A and 5B represent a change in an envelope of the RF signal S2 which is obtained when the two group object lenses shown by FIG. 1 are moved periodically in a sine waveform at a frequency of f2 in the optical axis direction by the second electromagnetic actuator 15 under the state in which the focus servo and the tracking servo are operated. Although FIGS. 5A and 5B show a case in which the focus offset is not optimized, when the focus offset is optimized, the focus is changed with a signal recording face of the optical disk 11 as a center and accordingly, at timings of t3 and t4 when periodic displacement is null in FIG. 5A, the envelope of the RF signal S2 shown by FIG. 5B is maximized. Further, in FIG. 5A, at a timing t1 where the two group object lenses become most proximate to the optical disk 11 and at a timing t2 where the two group object lenses become mostly remote from the optical disk 11, the envelope of the RF signal S2 is minimized.

In the meantime, when an amplitude A1 of the RF signal at the timing t1 and an amplitude A2 of the RF signal at the timing t2, the timing t1 and the timing t2 being both ends of a range of moving the two group object lenses, differ from each other, it signifies that the center value in the sine waveform shown by FIG. 5A is shifted from an optimum value of the focus offset. The criterion indicates whether the focus is disposed on this side of the signal face of the optical disk 11 or on the other side thereof and a large or small relationship between the amplitude A1 of the RF signal at the timing t1 and the amplitude A2 of the RF signal at the timing t2 shown by FIG. 5B, corresponds to the polarity of the error signal.

Accordingly, by adjusting the focus offset such that the amplitude A1 of the RF signal at the timing t1 and the amplitude A2 of the RF signal at the timing t2 shown by FIG. 5B become equal to each other by utilizing the relationship, the focus offset of the two group object lenses is adjusted to an optimum value.

By a method quite similar to the method of adjusting the focus set, mentioned above, the distance between the two group object lenses is adjusted to an optimum value.

That is, when the first electromagnetic actuator 13 mounted with the first lens 12 shown by FIG. 1 is periodically moved in a sine waveform at a frequency f1 to thereby change the distance between the two group object lenses, the RF signal S2 is provided with a maximum amplitude when the distance between the two group object lenses is an optimum distance. Under an optimum state, both at the timing t1 in which the first lens 12 becomes most proximate to the optical disk 11 and the timing t2 in which the first lens 12 becomes most remote from the optical disk 11, the envelope of the RF signal S2 is minimized. It is adjusted such that in FIG. 5A, "focus offset" corresponds to "distance between two group object lenses" and the amplitude A1 of the RF signal at the timing t1 and the amplitude A2 of the RF signal at the timing t2 shown by FIG. 5B, become equal to each other.

In this case, when the adjustment of the distance between the two group object lenses and the adjustment of the focus set are carried out simultaneously, a spherical aberration caused by the change in the distance between the two group object lenses and a focus servo error (defocus) simultaneously occur. When the focus servo cannot follow the adjustment, the RF signal S2 significantly undergoes a variation in the amplitude caused by the focus servo error and separation of the amplitude variation from a variation in the amplitude caused by the spherical aberration becomes difficult.

For that purpose, it is natural to set sufficient gain of the focus servo and on top of that, a period of periodically moving the distance between the two group object lenses is made longer than a period of integrally moving the two group object lenses for adjusting the focus offset. That is, a frequency f1 for moving the distance between the two group object lenses is made a low frequency satisfying Equation (8) and frequency bands of the amplitude variation caused by the spherical aberration and the amplitude variation caused by the focus servo error are separated.

$$f1 \ll f2 \tag{8}$$

For example, f1 and f2 are set such that f1=30 Hz and f2=1 kHz and the first and the second electromagnetic actuators 13 and 15 are periodically moved. In this case, the envelope of the RF signal S2 is synthesized by components of 30 Hz and 1 kHz. A signal of the f1 component which has passed through a low pass filter, not illustrated, in the envelope detection unit A33 represents a variation in the envelope in accordance with a change in the distance between the two group object lenses. In contrast thereto, a signal of the f2 component which has passed through a high pass filter, not illustrated, in the envelope detection unit B34 represents a variation in the envelope caused by the focus offset.

Further, the object of the low pass filter resides in separating the signal of the f1 component from the signal of the f2 component and therefore, it may be a band pass filter for passing a vicinity of f1. Similarly, the high pass filter may be a band pass filter for passing a vicinity of f2.

Further, in order to maximally achieve functions of these filters, the fewer the frequency components other than f1 and f2, the more improved is the above-described periodic variations. Because correct separation having small noise can be carried out. Therefore, sine wave having a single frequency component is most pertinent and a variation including high harmonic components as in a triangular wave, a trapezoidal wave or the like is not preferable. Accordingly, by moving the first and the second electromagnetic actuators 13 and 15 in the sine waveforms, a component of a variation in the amplitude caused by the spherical aberration and a component of a variation in the amplitude caused by the defocus can be separated with excellent S/N (Signal to Noise ratio).

Next, an explanation will be given of the procedure of the above-described adjusting method by the microcomputer 41 time-sequentially in reference to a flowchart shown by FIG. 6.

Figure 6:
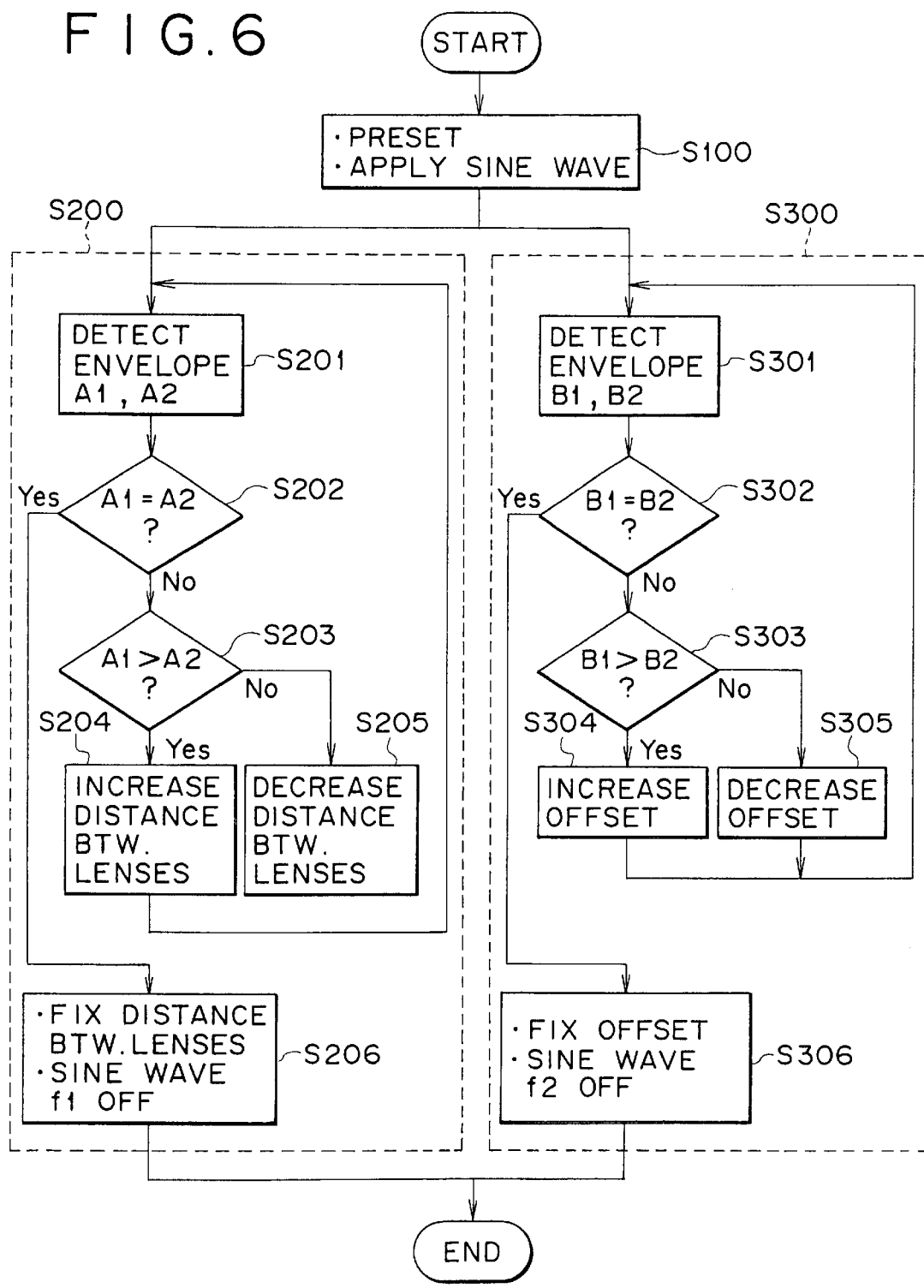
FIG. 6 is a flowchart showing a procedure of adjustment according to the embodiment of the present invention.

Further, for convenience of explanation, FIG. 6 shows amplitudes of outputs of the envelope detection unit A33 for adjusting the distance between the two group object lenses as designated by notations A1 and A2 and amplitudes of outputs from the envelope detection unit B34 for adjusting the focus offset which are amplitudes in correspondence with A1 and A2 as designated by notations B1 and B2.

In FIG. 6, at step S100, the focus offset as well as the distance between the two group object lenses are set to preset values. A drive signal in a sine waveform having the frequency of f1 is applied to the first electromagnetic actuator 13 to thereby slightly move the first lens 12 periodically in the optical axis direction. A drive signal in a sine waveform having the frequency of f2 is applied to the second electromagnetic actuator 15 to thereby slightly move the two group object lenses periodically in the optical axis direction.

At step S200, the distance between the two group object lenses is adjusted and at step S300, the focus offset is adjusted. Processings of step S200 and step S300 are executed by the microcomputer 41 in the same interruption processing at a period of, for example, 20 µs and accordingly, both are adjusted simultaneously in parallel with each other.

First, an explanation will be given of step S200.

At step S201, A1 and A2 are detected from outputs of the envelope detection unit A33 based on whether a timing of the drive signal in the sine waveform applied on the first electromagnetic actuator 13 is t1 or t2. That is, the amplitude from the envelope detection unit A33 at the timing t1 is detected as A1 and the amplitude from the envelope detection unit A33 at the timing t2 is detected as A2.

At step S202, as shown by FIG. 5B, whether A1=A2 is determined. In the case of A1=A2, the operation proceeds to step S206 and otherwise, the operation proceeds to step S203. In this case, the determination of whether A1=A2 includes a case in which a difference between A1 and A2 falls in a predetermined allowable range.

At step S203, whether A1>A2 is determined. In the case of A1>A2, the operation proceeds to step S204 and in the case of A1<A2, the operation proceeds to step S205, respectively.

At step S204, there is carried out a control for making the distance between the two group object lenses larger. This is because in this embodiment, A1>A2 corresponds to a case in which the distance between the two group object lenses is smaller than an optimum value. Thereafter, the operation returns to step S201. At step S205, there is carried out a control for making the distance between the two group object lenses smaller. This is because in the embodiment, A1<A2 corresponds to a case in which the distance between the two group object lenses is larger than the optimum value. Thereafter, the operation returns to step S201.

By repeating steps from S201 to S205, the optimum value of the distance between the two group object lenses is calculated.

At step S206, the distance between the two group object lenses is fixed, the drive signal in the sine waveform stops applying on the first electromagnetic actuator 13 and the adjustment of the distance between the two group object lenses is finished.

Next, an explanation will be given of step S300.

At step S301, B1 and B2 in correspondence with A1 and A2 of FIG. 5B are detected from the envelope detection unit B34. B1 and B2 are detected from outputs of the envelope detection unit B34 based on whether the timing of the drive signal in the sine waveform applied on the second electromagnetic actuator 15 is t1 or t2. That is, the amplitude from the envelope detection unit B34 at the timing to is detected as B1 and the amplitude from the envelope detection unit B34 at the timing t2 is detected as B2.

At step S302, whether B1=B2 is determined. In the case of B1=32, the operation proceeds to step S306 and otherwise, the operation proceeds to step S303. In this case, the determination of whether B1=B2 includes a case in which a difference between B1 and B2 falls in a predetermined allowable range.

At step S303, whether B1>B2 is determined. In the case of B1>B2, the operation proceeds to step S304 and in the case of B1<B2, the operation proceeds to step S305, respectively.

At step S304, there is carried out a control of increasing the focus offset. This is because in the embodiment, B1>B2 corresponds to that a signal face is more remote than a focused position. Thereafter, the operation returns to step S301. At step S305, there is carried out a control of decreasing the focus offset. This is because in the embodiment, B1<B2 corresponds to that the signal face is more proximate than the focused position. Thereafter, the operation returns to step S301.

By repeating steps from S301 to S305 as described above, an optimum value of the focus offset is calculated.

At step S306, the focus offset is fixed, the drive signal in the sine waveform stops applying on the second electromagnetic actuator 15 and adjustment of the focus offset is finished.

When step S206 and step S306 have been finished, the procedure is finished and a normal state is recovered.

Further, as previously described, the processings of step S200 and step S300 are executed in parallel with each other by the microcomputer 41 and accordingly, the adjustments are carried out simultaneously.

Although the embodiment is applied to an optical system of an optical pickup using the high numerical aperture object lenses having the constitution in which the distance between the two group object lenses is variable, the present invention is not limited to the object lenses but is applicable when a similar problem is posed in an optical pickup having a lens constitution in which a distance between two group lenses is variable. Further, the present invention can be realized by a quite similar method in an optical system of an optical pickup in which high numerical aperture object lenses in which a distance between two group object lenses is fixed or a high numerical aperture object lens comprising a single lens is used and the lens is combined with another lens.

Figure 7:
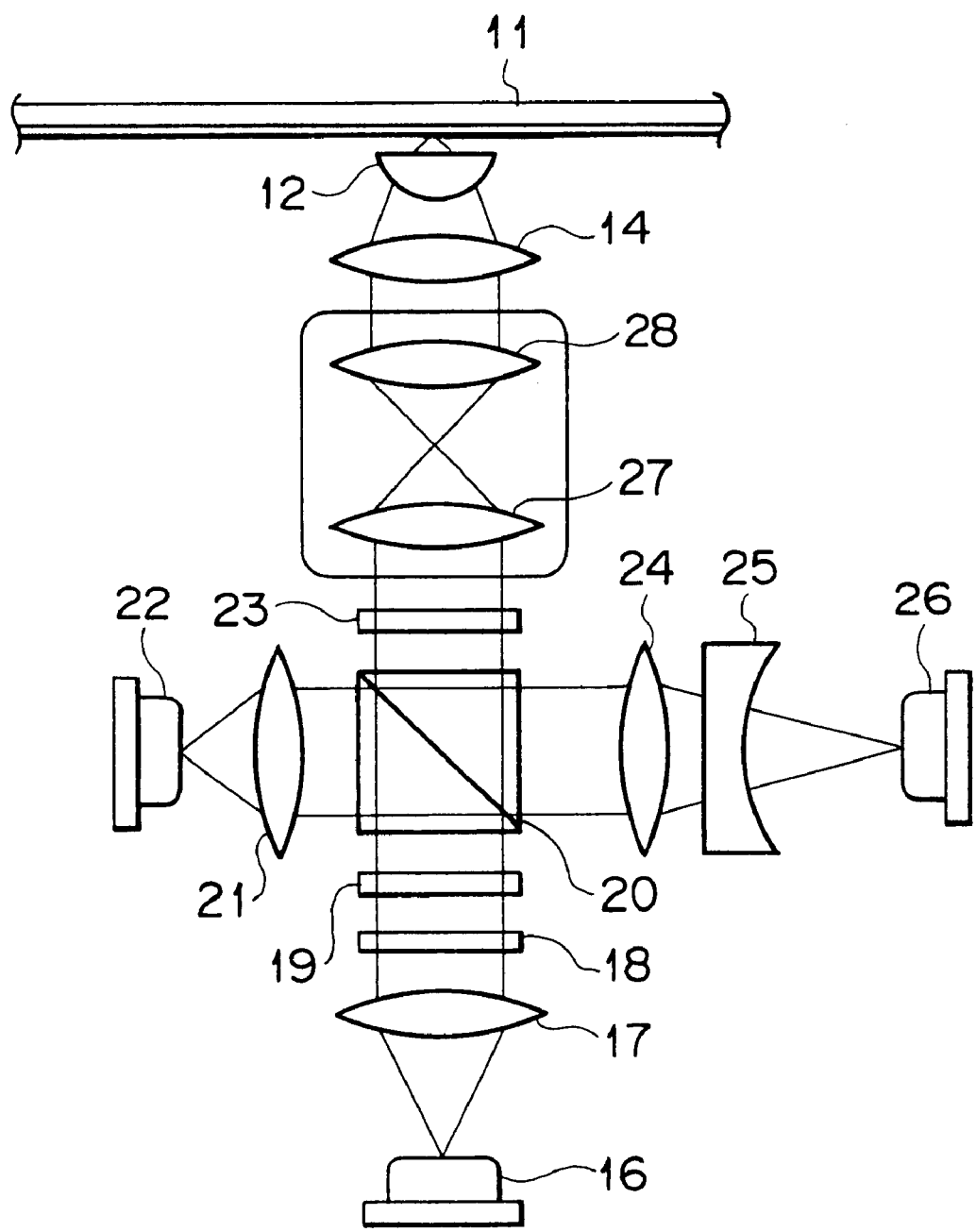
FIG. 7 is a view showing a constitution of an optical pickup of a type of fixing a distance between two group object lenses according to the embodiment of the present invention.

FIG. 7 is a view showing a constitution of an optical pickup of a type of fixing a distance between two group object lenses according to the embodiment. This is an embodiment in which relay lenses 27 and 28 for correcting spherical aberration are inserted between the ¼ wave plate 23 and the second lens 14 shown by FIG. 2. In FIG. 7, the relay lenses 27 and 28 are mounted on a first electromagnetic actuator, not illustrated. In the meantime, the two group object lenses are mounted on a second electromagnetic actuator, not illustrated, and are constituted to be able to control to an arbitrary position in an optical axis direction.

In the adjustment, when focus servo is being operated, in order to maximize the amplitude of the RF signal S2, optimization of a distance between the relay lenses 27 and 28 and the two group object lenses and optimization of the focus offset are carried out simultaneously. It is apparent that the adjustment can be carried out when the adjustment is executed by a method similar to the method which has been explained in detail in the embodiment having the constitution in which the distance between the two group object lenses is variable as mentioned above.

Further, instead of moving the relay lenses 27 and 28 in FIG. 7, by moving the collimator lens 17, an error signal caused by a spherical aberration produced between the relay lenses 27 and 28 and the two group object lenses is varied and accordingly, the spherical aberration can be minimized. In this case, the collimator lens 17 is mounted on a first electromagnetic actuator, not illustrated.

Further, the optical disk 11 may be a recordable disk or a disk exclusive for reproduction. When the apparatus is applied to a recordable optical disk, a recorded signal portion may be used or a bit portion which has previously been embossed may be used.

Further, in order to accurately detect the envelope variation from the RF signal, as shown by the embodiment, it is preferable to carry out the detection under a state in which the tracking servo is being operated along with the focus servo.

According to the above-described embodiment, the optical disk 11 may naturally be other optical record medium such as an optical card in which recording or reproducing is carried out by irradiating optical beam.

According to the optical recording and reproducing apparatus of the first aspect of the present invention, the optimization adjustment of the focus offset and the optimization adjustment of the distance between the two group lenses are simultaneously carried out and accordingly, there can be provided an apparatus for carrying out adjustments in a short period of time by separately carrying out the two adjustments. Thereby, after inserting the optical record medium into the apparatus, there can be brought about a state capable of recording or reproducing information in a short period of time.

According to the optical recording and reproducing apparatus of the second aspect of the present invention, by periodically carrying out the movement of the driving means for moving the total of the two group lenses and the movement of the driving means for changing the distance between the two group lenses, the variation in the amplitude caused by the spherical aberration and the variation in the amplitude caused by the focus servo error can be separated by a difference in frequency bands and there can be provided an apparatus for carrying out the adjustments by a simple structure by filters.

According to the optical recording and reproducing apparatus of the third aspect of the present invention, by making the movement period of the driving means for changing the distance between the two group lenses longer than the movement period of the driving means for moving the total of the two group lenses, there can be provided an apparatus for accurately detecting the variation in the amplitude caused by the spherical aberration.

According to the optical recording and reproducing apparatus of the fourth aspect of the present invention, by making the movement of the driving means for moving the total of the two group lenses and the movement of the driving means for changing the distance between the two group lenses in sine waveforms, components of variations necessary for the respective adjustments can be separated by filters. Therefore, there can be provided an apparatus for carrying out the accurate adjustments.

According to the optical recording and reproducing apparatus of the fifth aspect of the present invention, the optimization adjustment of the focus offset and the optimization adjustment of the distance between the object lens and the relay lens group are carried out simultaneously and accordingly, there can be provided an apparatus of carrying out the adjustments in a time period shorter than that in carrying out the two adjustments separately. Thereby, after inserting the optical record medium into the apparatus, there can be brought about a state capable of recording or reproducing information in a short period of time.

According to the optical recording and reproducing apparatus of the sixth aspect of the present invention, by periodically carrying out the movement of the optical lens and the movement of the relay lens group, the variation in the amplitude caused by the spherical aberration and the variation in the amplitude caused by the focus servo error can be separated by a difference in frequency bands and there can be provided an apparatus of carrying out the adjustments by a simple constitution by filters.

According to the optical recording and reproducing apparatus of the seventh aspect of the present invention, by making the movement period of the relay lens group longer than the movement period of the object lens, there can be provided an apparatus for accurately detecting the variation in the amplitude caused by the spherical aberration.

According to the optical recording and reproducing apparatus of the eighth aspect of the present invention, by making the movement of the object lens and the movement of the relay lens group in sine waveforms, components of variations necessary for the respective adjustments can be separated accurately by filters. Therefore, there can be provided an apparatus of carrying out the accurate adjustments.

According to the optical recording and reproducing method of the ninth aspect of the present invention, the adjustment of the focus offset and the adjustment of the distance between the two group lenses are carried out simultaneously and therefore, adjustments can be carried out in a time period shorter than that of carrying out the two adjustments separately. By the method, after the optical record medium is inserted into the optical recording and reproducing apparatus, there can be brought about a state capable of recording or reproducing information in a short period of time.

According to the optical recording and reproducing method of the tenth aspect of the present invention, by periodically carrying out the movement of the total of the two group lenses and the movement of the first lens for changing the distance between the two group lenses, the variation in the amplitude caused by the spherical aberration and the variation in the amplitude caused by the focus servo error can be separated by a difference in frequency bands and the adjustments can be carried out by a simple constitution by filters.

According to the optical recording and reproducing method of the eleventh aspect of the present invention, by making the movement period of the first lens for changing the distance between the two group lenses longer than the movement period of the total of the two group lenses, the variation in the amplitude caused by the spherical aberration can accurately be detected.

According to the optical recording and reproducing method of the twelfth aspect of the present invention, by making the movement of the total of the two group lenses and the movement of the first lens for changing the distance between the two group lenses in sine waveforms, components of variations necessary for the respective adjustments can accurately be separated by filters. Therefore, the accurate adjustments are made feasible.

According to the optical recording and reproducing method of the thirteenth aspect of the present invention, the optimization adjustment of the focus offset and the optimization adjustment of the distance between the object lens and the relay lens group are-carried out simultaneously and therefore, the adjustments can be carried out in a time period shorter than that for carrying out the two adjustments separately. By the method, after the optical record medium is inserted into the optical recording and reproducing apparatus, there can be brought about a state of capable of recording or reproducing information in a short period of time.

According to the optical recording and reproducing method of the fourteenth aspect of the present invention, by periodically carrying out the movement of the object lens and the movement of the relay lens group, the variation in the amplitude caused by the spherical aberration and the variation in the amplitude caused by the focus servo error can be separated by a difference in frequency bands and the adjustments can be carried out by a simple constitution by filters.

According to the optical recording and reproducing method of the fifteenth aspect of the present invention, by making the movement period of the relay lens group longer than the movement period of the object lens, the variation in the amplitude caused by the spherical aberration can accurately be detected.

According to the optical recording and reproducing method of the sixteenth aspect of the present invention, by making the movement of the object lens and the movement of the relay lens group in sine waveforms, components of variations necessary for the respective adjustments can accurately be separated by filters. Therefore, the accurate adjustments are made feasible.

What is claimed is:

1. An optical recording and reproducing apparatus for at least carrying out either of recording and reproducing of information by irradiating a beam to an optical record medium via two group lenses constituted by a first lens and a second lens, said optical recording and reproducing apparatus comprising:

first driving means for moving said first lens in an optical axis direction relative to said second lens; and second driving means for moving said two group lenses in the optical axis direction;

wherein first adjustment for optimizing a distance between said first lens and said second lens by using said first driving means and second adjustment for optimizing a focus offset by using said second driving means are simultaneously carried out by simultaneously operating said first driving means and said second driving means when focus servo is being operated.

2. An optical recording and reproducing apparatus as claimed in claim 1, wherein simultaneously with periodically moving said first lens in the optical axis direction relative to said second lens by said first driving means, said two group lenses constituted by said first lens and said second lens are periodically moved in the optical axis direction by the second driving means to thereby carry out the first and the second adjustments.

3. An optical recording and reproducing apparatus as claimed in claim 2, wherein a movement period of periodically moving said first lens relative to said second lens is longer than a movement period of periodically moving said two group lenses comprising said first lens and said second lens.

4. An optical recording and reproducing apparatus as claimed in claim 2, wherein said periodic movements are of sine waveforms.

5. An optical recording and reproducing apparatus for carrying out at least either of recording and reproducing of information by irradiating a beam to an optical record medium via an optical system having a constitution including an optical lens comprising one or more of lenses and a relay lens group comprising one or more of lenses, said optical recording and reproducing apparatus comprising:

first driving means for moving said relay lens group in an optical axis direction relative to said object lens; and second driving means for moving said object lens in the optical axis direction;

wherein first adjustment for optimizing a distance between said relay lens group and said object lens by using the first driving means and second adjustment for optimizing a focus offset by using the second driving means are simultaneously carried out by simultaneously operating said first driving means and said second driving means when focus servo is being operated.

6. An optical recording and reproducing apparatus as claimed in claim 5, wherein the adjustments are carried out by periodically moving said object lens and said relay lens group in the optical axis direction.

7. An optical recording and reproducing apparatus as claimed in claim 6, wherein a movement period of periodically moving said relay lens group is longer than a movement period of periodically moving said object lens.

8. An optical recording and reproducing apparatus as claimed in claim 6, wherein said periodic movements are of sine waveforms.

9. An optical recording and reproducing method of carrying out at least either of recording and reproducing of information by irradiating a beam to an optical record medium via two group lenses comprising a first lens and a second lens:

wherein first adjustment for optimizing a distance between said first lens and said second lens by moving said first lens in an optical axis direction relative to said second lens and second adjustment for optimizing a focus offset by moving said two group lenses in the optical axis direction are carried out simultaneously when focus servo is being operated.

10. An optical recording and reproducing method as claimed in claim 9, wherein said movements are periodic movements.

11. An optical recording and reproducing method as claimed in claim 10, wherein a movement period of periodically moving said first lens relative to said second lens is longer than a movement period of periodically moving said two group lenses comprising said first lens and said second lens.

12. An optical recording and reproducing method as claimed in claim 10, wherein said periodic movements are of sine waveforms.

13. An optical recording and reproducing method for carrying out at least either of recording and reproducing of information by irradiating a beam to an optical record medium via an optical system having a constitution includ ing an object lens comprising one or more of lenses and a relay lens group comprising one or more of lenses:

wherein first adjustment for optimizing a distance between said relay lens group and said object lens by moving said relay lens group in an optical axis direction relative to said object lens and second adjustment for optimizing a focus offset by moving said object lens in the optical axis direction are carried out simultaneously when focus servo is being operated.

14. A recording and reproducing method as claimed in claim 13, wherein said movements are periodic movements.

15. An optical recording and reproducing method as claimed in claim 14, wherein a movement period of periodically moving said relay lens group in the optical axis direction relative to said object lens is longer than a movement period of periodically moving said object lens in the optical axis direction.

16. An optical recording and reproducing method as claimed in claim 14, wherein said periodic movements are of sine waveforms.

* * * * *